Figure 1:
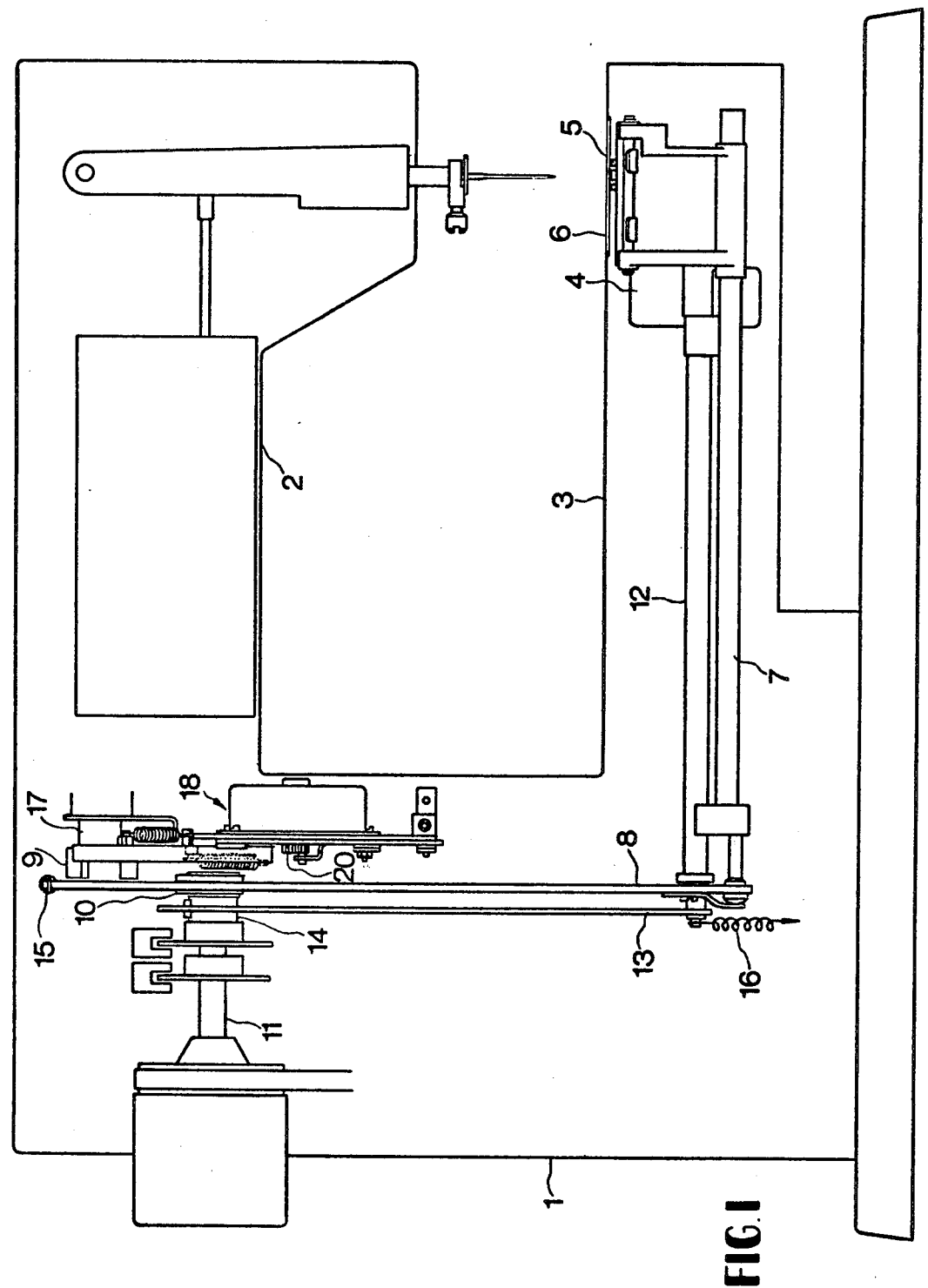

United States Patent [19]

Bergvall

[11] 4,191,120

[45] Mar. 4, 1980

[54] STITCH FORMING ELEMENT CONTROL USING STEPPING MOTORS WHICH CAN BE CALIBRATED

[75] Inventor: Bengt A. Bergvall, Jönköping, Sweden

[73] Assignee: Husqvarna AB, Sweden

[21] Appl. No.: 906,572

[22] Filed: May 16, 1978

[30] Foreign Application Priority Data

May 17, 1977 [SE] Sweden ............................. 7705778

[51] Int. Cl.² .................. D05B 3/00; D05B 69/12
[52] U.S. Cl. ................................ 112/158 E; 112/220; 318/696
[58] Field of Search ............... 112/158 E, 220, 121.12, 112/121.11, 275, 277; 310/49 R, 83; 318/685, 696

[56] References Cited

U.S. PATENT DOCUMENTS

| | | | |
|---|---|---|---|
| 3,970,016 | 7/1976 | Yanikoski | 112/121.12 |
| 3,974,787 | 8/1976 | Kraatz et al. | 112/121.12 |
| 4,103,632 | 8/1978 | Bowles | 318/685 X |

FOREIGN PATENT DOCUMENTS 2702488  7/1977  Fed. Rep. of Germany ....... 112/158 E

*Primary Examiner*—Peter P. Nerbun
*Attorney, Agent, or Firm*—Holman & Stern

[57] ABSTRACT

Disclosed is an improvement in a sewing machine supplied with stepping motors for the generation of setting movements of the stitch forming elements. A mechanical stop is provided in order to permit the stepping motors to be calibrated against the stop and thus provide precise settings of the stitch forming elements. Protection against jamming is provided by the use of elastic members between the coupling arm and linkages such that the elastic members absorb external forces against which the stepping motor is to be protected in order to keep the calibration intact. Additionally disclosed is an apparatus for setting the stepping motor either in whole steps or in arbitrary intermediate steps which are actually between two discrete stable positions.

14 Claims, 4 Drawing Figures

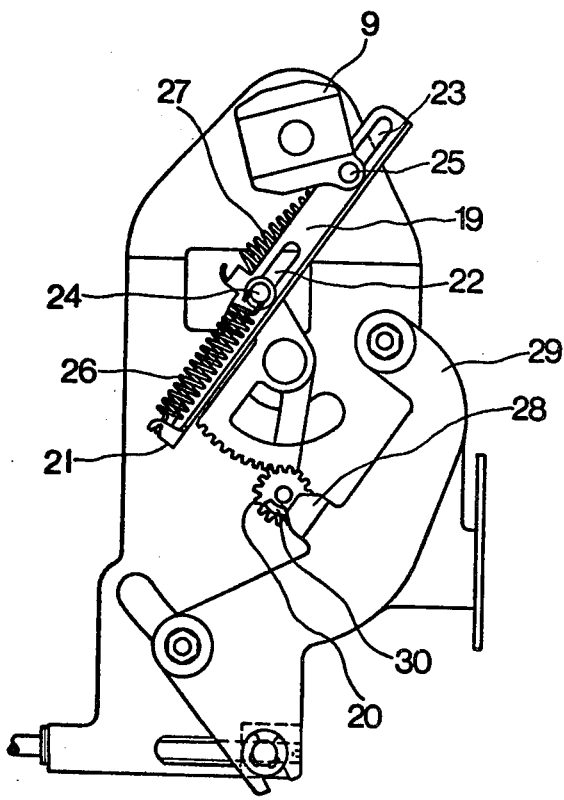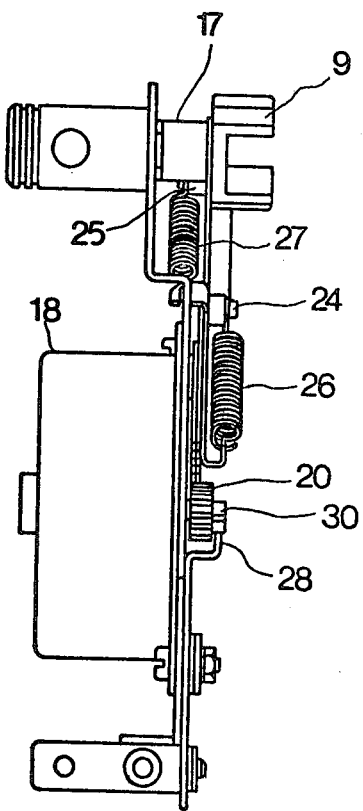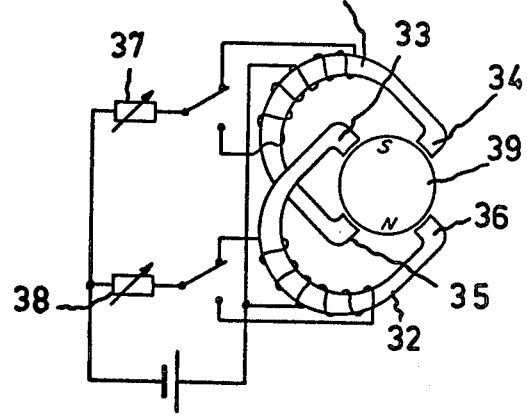

stitch forming element control using stepping motors which can be calibrated

BACKGROUND OF THE INVENTION

The present invention relates to a sewing machine comprising a control element influenced by electric signals for the generation of feed movements of the fabric feeder and, in zig-zag machines, closing movements of the needle-bar. In an earlier known arrangement for the generation of setting movements of the stitch-forming elements in a sewing machine, as described in the German patent publication OS 2415761, a complicated multi-stage linkage system, comprising a number of electromagnets, has been resorted to for solving the problem of producing mechanical movements from electric control signals. Such a linkage system has a high noise level in operation and requires much space in the machine, apart from being expensive and complicated in its manufacture.

SUMMARY OF THE INVENTION

It is the object of the present invention to produce a sewing machine provided with stepping motors for the generation of setting movements in the stitch-forming elements. Stepping motors are suitable for digital systems and allow simple system solutions. The use of stepping motors as power source for setting movements in a sewing machine is associated with problems that have to be solved. The present invention specifies solutions for such problems, namely for one, the setting of a link into certain angular positions for the control of the size of the feed movement by means of a stepping motor and movement-transmitting elements, the setting taking place either in whole steps or in arbitrary intermediate positions between two discrete, stable positions. The solution of this control problem in accordance with the invention consists in that the currents to at least two windings in the stepping motor are controlled, so that the holding force for each step position can be varied and combined with the adjacent holding force, so that the resulting combined holding force provides a stable position, even between the normal discrete positions; secondly, to eliminate the risk of the stepping motor being set unintentionally into a faulty initial position owing to its rotor being displaced from its correct position by external forces. The problem is to provide a coupling arrangement between the stepping motor and the driven element (needle-bar or feeder), which would prevent external forces above a certain magnitude from reaching the motor. On the other hand the coupling arrangement should provide a good transmission of movement from the motor to the driven element within the power usage required for adjustment of the element. One solution of the problem consists in providing a coupling arm with elastic members between the motor and the element, which members absorb the external forces against which the motor is to be protected; thirdly the setting of an initial position (zero position) for the stepping motor driving arrangement. When a voltage is applied to a stepping motor, the latter may assume a number of different positions. The exact (or desired) position is not directly given but has to be determined. This may be done in that the motor is "calibrated" against a stop, this being done so that the motor is "stepped" towards a mechanical stop, which then constitutes the initial position of the motor. After such a calibration the position of the motor is known, and the motor can be set to the desired position. Such a solution of the problem of calibrating the stepping motor in a driving arrangement for link-setting or zig-zag control in a sewing machine is achieved when the arrangement is realized as specified by a stepping motor driving arrangement comprising a stepping motor connected to electronic pattern data circuits in the machine and a setting arrangement for the calibration of the stepping motor in a defined initial position in the form of a mechanical stop and a dog, placed on an immovable part and a movable part respectively in the stepping motor driving arrangement, and a stepping feed circuit in the pattern data circuits, the signals emitted from which step the motor towards the said stop where it is stopped.

BRIEF DESCRIPTION OF A PREFERRED EMBODIMENT

An embodiment of the invention, as applied to a sewing machine, is described in the following with reference to the enclosed drawing which shows in FIG. 1 a vertical projection of the rear of a sewing machine with the rear wall having been removed and certain parts having been left out, FIG. 2 a vertical projection of the stepping motor driving arrangement in the sewing machine, FIG. 3 a side projection of the arrangement in FIG. 2, FIG. 4 a simplified wiring diagram of the stepping motor in the arrangement according to FIG. 2.

The main parts of the sewing machine, the stand 1 the upper and lower arm 2, 3 as well as driving elements and transmissions can be seen in FIG. 1. In the lower arm a shuttle mechanism 4, a feeder 5 and a stitch-plate 6 are arranged as in a conventional sewing machine. The feeder which performs a largely rectangular movement comprises two driving elements, one for horizontal movement and one for vertical. The horizontal movement, which should be variable, is brought about by means of a linkage system 7, 8, a controllable link 9 and an eccentric driving element 10 on the upper arm axle 11 of the machine which generates the feed movement. The vertical movement is constant and is brought about by a second linkage system 12, 13 and a further eccentric driving element 14 on the upper arm axle, which generates an upward movement. The driving elements 10, 14 are single-acting and the return movements are achieved with the help of springs 15, 16.

The adjustable link 9 is supported by means of an axle 17 and can be set into different angular positions in accordance with the set of stitches that is to be sewn. For the setting of the link a stepping motor unit 18 and a movement transmission arrangement 19 are provided in the machine. The stepping motor is of the electromagnetic type and comprises a gear 20, from which the step movements for the transmission arrangement are taken off. The latter consists of a gearing and a special coupling bar 21 which is provided on both its ends with an oblong hole 22, 23, in which is inserted a crank pin 24 and an axle journal 25 respectively. The pins are held against one end of their respective hole with the help of springs 26, 27. The coupling bar can transmit push as well as pull movements. In the push movement the spring 26 is loaded, in pull movements the spring 27. The springs are given initial stress and a rigidity which permits transmission of step movements to the link without any appreciable elasticity in the movements. On the other hand, if the link is exposed to an external force (for example if the feeder becomes jammed), any movement so produced should not be transmitted to the stepping motor, which as a result might come out of phase, but such a movement should be stored in the respective spring 26 or 27. The stepping motor thus offers a greater resistance to the movement than the spring in question does, which means that the stepping motor remains in the assumed position, while the spring moves. As soon as the external force ceases, or the stepping motor is stepped to another position, the spring assumes its previous position. The stepping of the stepping motor follows digital pulses which are generated in an electronic unit in the sewing machine. If the motor through the effect of external forces, were to be set into an arbitrary position, the control over its function would get lost, in other words, it would not be possible to keep the initial position of the motor constant.

A well-defined initial position (zero-position) of the stepping motor is of major importance for its function as a control device for the setting of the position of the link, which, as mentioned previously, is determined by the digital signals. In cases where the range of operation of the motor lies within a turn of rotation of its axle, the possibility exists of arranging a mechanical stop at the one end of the range of operation, so that a fixed, well-defined position is formed. In the embodiment shown such an end stop is formed by a peg 28, projecting in the holder 29 of the stepping motor and co-operating with a dog 30 in the gearing between the motor and the rack. The setting of the motor in this position, which constitutes the end position, takes place so that the electronic unit emits a number of digital pulses which cause the motor to step towards the stop; after such a series of pulses the motor is calibrated, that is to say it is set in the initial position. When the electronic unit subsequently emits a certain digital code, the motor responds, in that it performs a corresponding number of steps from the initial position.

From the above it is evident that the operating movement of the stepping motor consists of a number of steps of a defined magnitude. This would lead to an approximate setting of the driven element, if the stepping motor were not supplemented by an arrangement for the fine setting of the element. Such an arrangement is shown diagrammatically in FIG. 4. The stator of the motor is shown as two horseshoeshaped electromagnets 31, 32. The poles 33, 34 jointly form the north pole, and the poles 35, 36 consequently form the south pole. By modifying the currents to the electromagnets, the north pole or south pole respectively can be displaced against one of the poles 33, 34 or 35, 36 respectively. The arrangement for the modification of the currents consists in the embodiment shown here of a pair of rheostats 37, 38. When the current to one electromagnet is increased, the current to the other is reduced. An alteration in the position of the poles of the stator produces a corresponding alteration of the discrete position of the rotor 39. In practice the position of the rotor from the pole 33 to the pole 34 and vice versa can be altered only by means of modulation of the currents to the electromagnets 31, 32. This control facility is utilized for the fine setting of the link, especially in the area around zero feed. It is also possible by means of this arrangement to set the feed manually, for example by the mechanical coupling of the rheostat to a hand wheel on the front side of the machine.

I claim:

1. A sewing machine comprising control elements influenced by electric signals for the setting of a link in the driving arrangement of the fabric feeder and/or the generation of swinging movements of a needle-bar in side direction, characterized in that each control element consists of a stepping motor driving arrangement comprising a stepping motor connected to electronic pattern data circuits in the machine and a setting arrangement for the calibration of the stepping motor in a defined initial position in the form of a mechanical stop and a dog, placed on an immovable part and a movable part respectively in the stepping motor driving arrangement, and a stepping feed circuit in the pattern data circuits, the signals emitted from which step the motor towards the said stop where it is stopped.

2. A sewing machine in accordance with claim 1, characterized in that the mechanical stop constitutes at least one end position of the operating range of the motor.

3. A sewing machine in accordance with claim 3, characterized in that the mechanical stop is adjustable in respect of the dog.

4. A sewing machine in accordance with claim 3, characterized in that the mechanical stop coincides with a discrete position in the operating range of the motor, from which position the stepping originates.

5. A sewing machine in accordance with claims 1, 2, 3, or 4, characterized in that the mechanical stop is formed by a peg, tongue etc. attached to the body of the driving arrangement, and the dog consists of an angle, sector etc. on the stepping motor axle.

6. A sewing machine in accordance with claim 1, characterized in that a coupling arrangement which includes a linkage with elastic members between the parts of the coupling between stepping motor and link, which are thus elastically joined together by the linkage.

7. A sewing machine in accordance with claim 6, characterized in that the linkage is adapted to transmit pull as well as push movements from the stepping motor to the link.

8. A sewing machine in accordance with claim 6, characterized in that the elastic members are given initial stress and exercise a force between the said parts joined together in the coupling, which is greater than the force required for the adjustment of the link.

9. A sewing machine in accordance with claim 6, characterized in that the force exercised as a result of the initial stress is smaller than the holding force exercised in the motor.

10. A sewing machine in accordance with claims 1, 2, 3, 4, 6, 7, 8 or 9, characterized in that a gearing is included in the stepping motor driving arrangement which gears down the stepping movement from the motor to the coupling arrangement.

11. A sewing machine in accordance with claim 1, characterized in that each stator pole of the stepping motor is made up of two individually magnetizable sub-poles, and a current distributing arrangement to the electromagnets of the motor, whose sub-poles consequently receive degrees of magnetization which differ from one another, with accompanying shifting of the resulting pole force (holding force) from the center of the pole towards one or other of the sub-poles.

12. A sewing machine in accordance with claim 11, characterized in that the current distribution arrangement consists of two rheostats, coupled mechanically so that in a setting process one of them increases while the other decreases, and each is connected separately in series to the winding of the corresponding electromagnet.

13. A sewing machine in accordance with claim 12, characterized in that the rheostats are coupled together mechanically by means of an axle with hand wheel.

14. A sewing machine in accordance with claim 11, characterized in that the discrete, stable position of the motor coincides with the resulting pole force in each stator pole.

* * * * *